April 8, 1941.
R. HOFMANN, JR
2,237,433
AUTOMATIC TRANSMISSION
Filed March 8, 1939
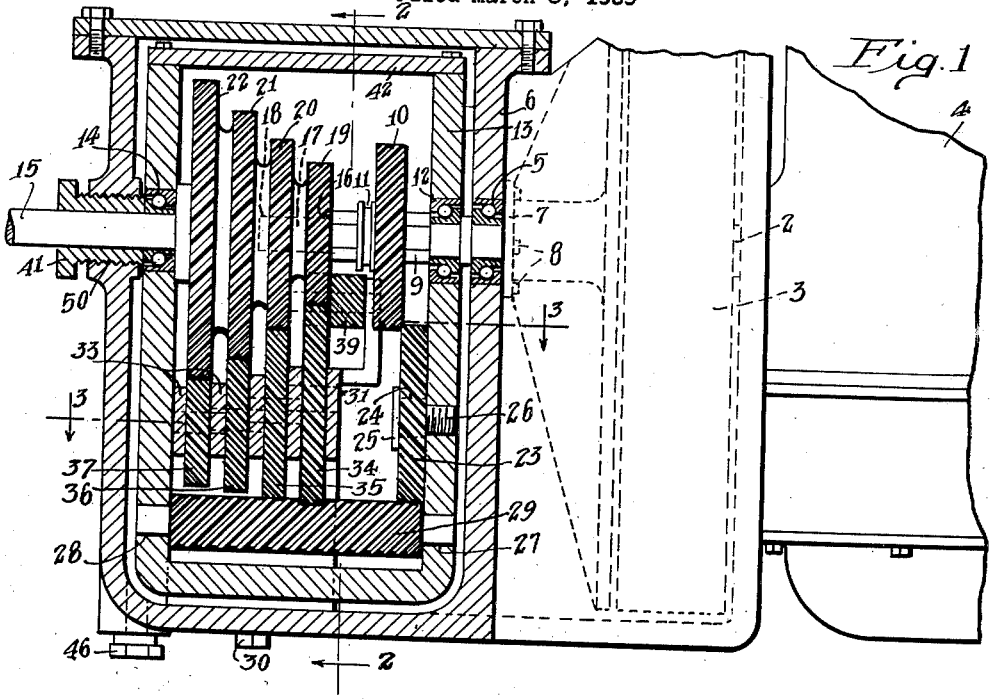
Fig.1
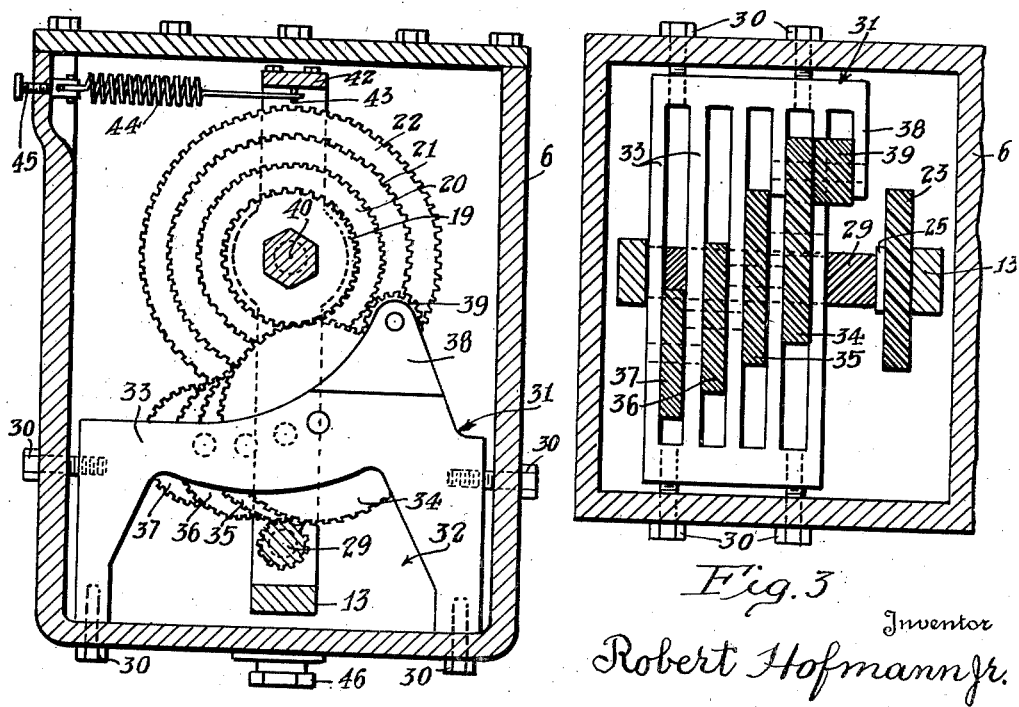
Fig.2
Fig.3
Inventor
Robert Hofmann Jr.
By Lyon Lyon
Attorney Patented Apr. 8, 1941

2,237,433

UNITED STATES PATENT OFFICE 2,237,433

AUTOMATIC TRANSMISSION

Robert Hofmann, Jr., Culver City, Calif.

Application March 8, 1939, Serial No. 260,579

11 Claims. (Cl. 74—337)

This invention relates to transmissions for vehicles, and more particularly to an automatic transmission whereby the gear ratio or power ratio between the driving member and the driven member is automatically determined by the resistance existing at any particular moment to the movement of the driven member.

It is therefore an object of this invention to provide a transmission in which the selection of gear ratio between the drive member and the driven member is directly responsive to the varying load upon the driven member.

It is a further object of this invention to provide an automatic transmission for use in motor vehicles in which the selection of gear, whether low, second, high, etc., is rendered independent of the driver and entirely automatic.

It is a further object of this invention to provide a transmission for motor vehicles which obviates the necessity of manually shifting gears to accommodate the need for an increased power ratio.

It is a further object of this invention to provide a simple, economical automatic transmission in which the torque set up by the load upon the driven member actuates the transmission in such a manner that an increased torque will cause the provision of an increased gear ratio.

It is a further object of this invention to utilize the torque set up by the resistance upon the driven member to directly actuate a gear shifting mechanism, without the interposition of a secondary mechanism for shifting the gears.

It is a further object of this invention to produce the device of the class described which will be compact and simple in design with a minimum number of shifting mechanisms.

Other objects and advantages will appear hereinafter.

In the accompanying drawing:

Fig. 1 is an elevation partly in section, showing an adaptation of my invention to a motor and a driven member.

Fig. 2 is a section taken along the line 2—2 of Fig. 1.

Fig. 3 is a section taken upon the level of the broken line 3—3 of Fig. 1.

Referring more particularly to the drawing, 2 indicates a drive member carrying a flywheel 3, and it may form the drive shaft of a conventional automobile motor 4. A bearing 5 is provided in the transmission housing 6 and is held in place by a plate 7 which is bolted to the housing by bolts 8. The drive shaft 2 is splined at 9 and carries sliding gear 10 thereon. A flange 11 is provided upon gear 10 which may be engaged by a fork or dogs (not shown) upon the end of a manually operated lever (not shown) for shifting the transmission into reverse gear. A second bearing 12 is provided for drive shaft 2 in U-shaped member 13 and a further bearing 14 is provided for driven shaft 15, also upon U-shaped member 13. A shoulder is formed upon drive shaft 2 as at 16 and an extension 17 of said shaft is carried in a recess 18 formed in driven shaft 15. Formed upon, and preferably integral with driven shaft 15, are shown four gears 19, 20, 21 and 22, which are the driven gears in my transmission.

Carried by U-shaped member 13 is a gear 23 mounted for rotation upon a bearing 24 and retained by a plate 25 formed at the end of stud 26. The gear 23 is adapted to enmesh with gear 10 for forward driving of the vehicle. It will be understood that gear 10, as shown in Fig. 1, is in neutral position and may be slid forward upon spline 9 to engage gear 23.

Journaled in bearings 27 and 28 in U-shaped member 13, is a gear 29. The gear 29 is constantly in mesh with gear 23.

Bolted to the housing 6 by a plurality of bolts 30 is a plate or bracket 31. This bracket 31 is irregularly shaped and is open at 32 to permit oscillation of U-shaped member 13 and gear 29 therein. Forming a part of the bracket 31 are a plurality of ribs 33 upon which are mounted, by suitable bearings, gears 34, 35, 36 and 37. Also mounted upon bracket 31 by means of rib 38 is reverse idler 39. The reverse idler 39 is constantly in mesh with gear 34 and is adapted to be engaged by gear 10 to provide a reversal of the drive. The gears 34, 35, 36 and 37 are of progressively decreasing diameters and have their centers so positioned by the bracket 31 and ribs 33 that their lowermost extending gear teeth are in line with a circle drawn with its center at 40, the center of oscillation of the U-shaped member 13.

The gears 34, 35, 36 and 37 are also positioned as shown in Fig. 2, so that each smaller diameter gear is offset to the left in position to be engaged by the gear 29 as the U-shaped member 13 swings to the left of Fig. 2. Gear 34 is constantly in mesh with gear 19; gear 35 is similarly in constant mesh with gear 20, gear 36 with gear 21, and gear 37 with gear 22, as clearly shown in Fig. 1.

Driven shaft 15 is carried in a bearing 41 threaded into housing 6, as at 50.

Referring to Fig. 1, bolted across U-shaped member 13 at the upper end thereof, is shown a bar 42. Attached to the bar 42 by a rivet or other suitable means 43 is one end of a coil spring 44. The other end of spring 44 is attached to the housing 6 by means of an adjustable bolt or stud 45. By rotating the bolt 45 the tension upon spring 44 may be variably adjusted.

Though I have shown the resistance element 44 as comprising a coil spring, it is obvious that any device capable of yielding and presenting a progressively increasing resistance to such yielding, may be substituted; for example, a piston and cylinder may be employed either with or without hydraulic fluid.

A drain plug 46 may be provided upon the housing 6, as shown in Fig. 1.

In operation, power is supplied to the driving shaft 2 by the motor 4 and the gear 10 is placed in mesh with gear 23 by means of the fork or dogs (not shown). The gear 10 revolves the gear 23 which in turn rotates the gear 29. The gear 29 will be in mesh with one of the gears 34, 35, 36 or 37. By this means rotation is imparted through the corresponding driven gears 19, 20, 21 or 22 to the driven shaft 15. Increased resistance to the rotation of the driven shaft 15 will cause increased torque upon the U-shaped member 13, which will in turn cause the gear 29 to ride from mesh with the gear 34 and into mesh with the gear 35; and so on until the power ratio imparted by the gear trains 29—34—19, or 29—35—20, etc. reaches the desired operating balance with the road resistance to the rotation of the driven shaft 15. This ratio of balance can be selectively determined by adjusting resistance element 44, as by means of bolt 45, or other suitable means.

It will thus be apparent that I have provided an automatic transmission in which the selection of gears while in forward drive is entirely independent of any manually operated lever. The tension upon the resistance element 44 may be set at the desired degree, which may be either calculated by well-known rules of mechanics, or determined by tests, so that a given change in road conditions or grade, with a corresponding change in torque upon the U-shaped member 13, will cause the automatic selection of the desired gear ratio.

For reverse movement, the gear 10 is moved upon spline 9 by means of a lever carrying a fork or dogs which engage the flange 11. When gear 10 is in the position shown in Fig. 1, the transmission is in neutral and no power is delivered to the driven shaft 15. If gear 10 is in mesh with reverse idler 39, reverse rotation will be imparted to the shaft 15 by means of gears 34 and 19. It will be seen from Figs. 1 and 3 that reverse idler 39 is formed wide enough to engage simultaneously the gears 10 and 34.

While the particular forms of the invention herein described are well adapted to carry out the objects of my invention, it is to be understood that various modifications and changes may be made without departing from the principles of the invention, and the invention includes all such modifications and changes as come within the scope of the appended claims.

I claim:

1. In a transmission, a drive member, a driven member, torque means mounted on said drive and said driven members, a gear carried by said torque means and driven by said drive member, a series of gear trains connected with said driven member, said torque means being adapted to selectively engage said gear with any of said series of gear trains in response to varying resistance upon said driven member.

2. In a transmission, a drive member, a driven member, a series of gear trains of progressively increasing gear ratio, and means pivotally mounted upon said drive member and said driven member responsive to increased torque upon said driven member, whereby power from said drive member is selectively imparted to either of said gear trains.

3. In a transmission, a drive shaft, a driven shaft, torque means mounted for oscillation about said drive and said driven shafts, a drive gear mounted upon said drive shaft, a first gear mounted upon said torque means for engagement with said drive gear, a second gear mounted upon said torque means and enmeshed with said first gear, a series of gear trains of progressively increasing gear ratio connected with said driven shaft, and means including said torque means whereby a predetermined amount of increased torque upon said driven shaft will bring said second gear into engagement with one of said series of gear trains of increased gear ratio.

4. In a transmission, a drive shaft, a driven shaft, torque means mounted for oscillation about said drive and said driven shafts, a drive gear mounted upon said drive shaft, a first gear mounted upon said torque means for engagement with said drive gear, a second gear mounted upon said torque means and enmeshed with said first gear, a series of gear trains of progressively increasing gear ratio connected with said driven shaft, and means including said torque means whereby a predetermined amount of increased torque upon said driven shaft will bring said second gear into engagement with one of said series of gear trains of increased gear ratio, and means for variably adjusting the amount of increased torque upon said driven shaft required to cause such change in engagement.

5. In a transmission, a drive member, a driven member, torque means mounted on said drive and said driven members, a gear carried by said torque means and driven by said drive member, a series of gear trains connected with said driven member, said torque means being adapted to selectively engage said gear with any of said series of gear trains in response to varying resistance upon said driven member, and means for adjusting the amount of increased torque required to cause such engagement.

6. In a transmission, a drive shaft, a driven shaft, torque means mounted for oscillation about said drive and said driven shafts, a drive gear mounted upon said drive shaft, a first gear mounted upon said torque means for engagement with said drive gear, a second gear mounted upon said torque means and enmeshed with said first gear, a series of gear trains of progressively increasing gear ratio connected with said driven shaft, means including said torque means whereby a predetermined amount of increased torque upon said driven shaft will bring said second gear into engagement with one of said series of gear trains of increased gear ratio, and means for reversing the direction of said driven member.

7. In a transmission, a drive shaft, a driven shaft, torque means mounted for oscillation about said drive and said driven shafts, a drive gear mounted upon said drive shaft, a first gear mounted upon said torque means for engagement with said drive gear, a second gear mounted upon said torque means and enmeshed with said first gear, a series of gear trains of progressively increasing gear ratio connected with said driven shaft, means including said torque means whereby a predetermined amount of increased torque upon said driven shaft will bring said second gear into engagement with one of said series of gear trains of increased gear ratio, and means engaging said drive gear for reversing the direction of said driven member.

8. In a transmission, a driven member, a primary drive member, a series of gear trains of progressively increasing gear ratio connected with said driven member, a torque means pivotally mounted for oscillation about said driven member and said primary drive member, a secondary drive member carried by said torque means, and means including said torque means whereby an increased torque upon said driven member will engage said secondary drive member with one of said series of gear trains of increased gear ratio.

9. In a transmission, a driven member, a primary drive member, a series of gear trains of progressively increasing gear ratio connected with said driven member, a torque means pivotally mounted for oscillation about said driven member and said primary drive member, a secondary drive member carried by said torque means, and means including said torque means whereby an increased torque upon said driven member will engage said secondary drive member with one of said series of gear trains of increased gear ratio, and whereby a decreased torque upon said driven member will engage said secondary drive member with one of said series of gear trains of decreased gear ratio.

10. In a transmission, a driven member, a primary drive member, a series of gear trains of progressively increasing gear ratio connected with said driven member, a torque means pivotally mounted for oscillation about said driven member and said primary drive member, a secondary drive member carried by said torque means, and means including said torque means whereby an increased torque upon said driven member will engage said secondary drive member with one of said series of gear trains of increased gear ratio, and means for reversing the direction of said driven member.

11. In a transmission, a driven member, a primary drive member, a series of gear trains of progressively increasing gear ratio connected with said driven member, a torque means pivotally mounted for oscillation about said driven member and said primary drive member, a secondary drive member carried by said torque means whereby a predetermined amount of increased torque upon said driven member will engage said secondary drive member with one of said series of gear trains of increased gear ratio, and means for adjusting the amount of increased torque required to cause such engagement.

ROBERT HOFMANN, Jr.